United States Patent
Yang et al.

(10) Patent No.: US 11,250,340 B2
(45) Date of Patent: Feb. 15, 2022

(54) FEATURE CONTRIBUTORS AND INFLUENCERS IN MACHINE LEARNED PREDICTIVE MODELS

(71) Applicant: Microsoft Technology Licensing, LLC, Redmond, WA (US)

(72) Inventors: Jilei Yang, Ningbo (CN); Wei Di, Cupertino, CA (US); Nidhi Sehgal, Fremont, CA (US); Songtao Guo, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1079 days.

(21) Appl. No.: 15/842,418

(22) Filed: Dec. 14, 2017

(65) Prior Publication Data
US 2019/0188588 A1  Jun. 20, 2019

(51) Int. Cl.
  *G06N 7/00* (2006.01)
  *G06K 9/62* (2022.01)
  (Continued)

(52) U.S. Cl.
  CPC ......... *G06N 7/005* (2013.01); *G06F 16/9535* (2019.01); *G06K 9/6247* (2013.01);
  (Continued)

(58) Field of Classification Search
  None
  See application file for complete search history.

(56) References Cited

U.S. PATENT DOCUMENTS

2019/0267113 A1* 8/2019 Okanohara ............ G16B 25/10

OTHER PUBLICATIONS

Bohanec, Marko, et al., "Explaining Machine Learning Models in Sales Predictions", Expert Systems with Applications, (2016), 1-13.
(Continued)

*Primary Examiner* — David R Vincent
(74) *Attorney, Agent, or Firm* — NDWE, LLP.

(57) ABSTRACT

In an example, for each feature of one or more features of a target sample data, feature values for one or more pseudo-samples are generated using, localized stratified sampling. The one or more pseudo-samples are fed into the trained machine learned model to obtain their prediction values. A piecewise linear regression model is trained using the one or more pseudo-samples and their prediction values, the piecewise linear regression model having two coefficients for each feature, a first coefficient describing prediction change when a corresponding feature value is increased and a second coefficient describing prediction change when a corresponding feature value is decreased. A top positive feature influencer is identified based on a feature of the one or more features of the target sample having a greatest magnitude of positive first coefficient or greatest magnitude of negative second coefficient. A top negative feature influencer is identified based on a feature of the one or more features of the target sample having a greatest magnitude of negative first coefficient or greatest magnitude of positive second coefficient. A top feature contributor is identified based on a feature of the one or more features of the target sample having a greatest magnitude of a combination of second coefficient and feature value in the target sample data.

20 Claims, 12 Drawing Sheets

(51) Int. Cl.
  G06Q 30/02       (2012.01)
  G06N 20/00       (2019.01)
  G06F 16/9535     (2019.01)
  G06Q 50/00       (2012.01)
  G06F 17/18       (2006.01)
(52) U.S. Cl.
  CPC ......... G06N 20/00 (2019.01); G06Q 30/0201 (2013.01); G06F 17/18 (2013.01); G06Q 50/01 (2013.01)

(56) References Cited

OTHER PUBLICATIONS

Friedman, Jerome H, "Greedy Function Approximation: A Gradient Boosting Machine", In Proceedings of the Annals of Statistics, vol. 29, No. 5, (Oct. 2001), 1189-1232.

Goldstein, Alex, et al., "Peeking Inside the Black Box: Visualizing Statistical Learning with Plots of Individual Conditional Expectation", Journal of Computational and Graphical Statistics 24.1, (2015), 44-65.

Krause, Josua, et al., "Interacting with Predictions: Visual Inspection of Black-box Machine Learning Models", Proceedings of the 2016 CHI Conference on Human Factors in Computing Systems., (2016), 1-12.

Lei, Jing, et al., "Distribution-Free Predictive Inference for Regression", Journal of the American Statistical Association, (2017), 1-50.

Moeyersoms, Julie, et al., "Explaining Classification Models Built on High-Dimensional Sparse Data", ICMI. Workshop on Human Interpretability in Machine Learning, (2016), 36-40.

Ribeiro, Marco T, et al., "Why should I trust you? Explaining the Predictions of Any Classifier", Proceedings of the 22nd ACM SIGKDD International Conference on Knowledge Discovery and Data Mining., (2016), 1-10.

* cited by examiner

US 11,250,340 B2

FEATURE CONTRIBUTORS AND INFLUENCERS IN MACHINE LEARNED PREDICTIVE MODELS

TECHNICAL FIELD

The present disclosure generally relates to technical problems encountered in machine learned models. More particularly, the present disclosure relates to determining feature contributors and influencers in machine learned predictive models.

BACKGROUND

Machine learned predictive models are used in a variety of industries to predict aspects of samples or candidates based on predetermined or learned features. In one example, predictive models are used in business-to-business (B2B) sales predictions. In a social networking service, for example, an internal sales team may wish to determine which potential customers are likeliest to purchase a product or service. Machine learned models may be used to make such predictions based on various pieces of input information, such as member profiles, usage and history information, and third party database information. Examples of such predictive models include random forest models, gradient boosting models, and deep neural networks.

Many of these machine learned models, however, make their predictions without outputting an indication of the features that are important in their determination. The models that do output an indication of the important features do so only at the global level, not at the individual sample level. For example, a model may indicate that user activity within the last few weeks on a feed portion of the social networking service is an important feature generally across all samples, but it does not indicate that for company X, user activity within the last few weeks on a feed portion of the social networking service is a most important feature whereas for company Y, the length of time the user has been on the service is a most important feature.

This information could be critical in a determination as to whether a model is useful to the entity interpreting the results. A sales team for a particular product, for example, may wish to know what the top features are for a small set of large companies to which it wants to sell, as opposed to generally knowing what the top features are across more potential customers, but including many to which it doesn't want to sell.

BRIEF DESCRIPTION OF THE DRAWINGS

Some embodiments of the technology are illustrated, by way of example and not limitation, in the figures of the accompanying drawings.

DETAILED DESCRIPTION

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, an advanced model interpretation method is provided to provide localized stratified sampling and piecewise linear regression of machine learned predictive models. It provides sample-level feature reasoning and is model-agnostic.

Figure 1:
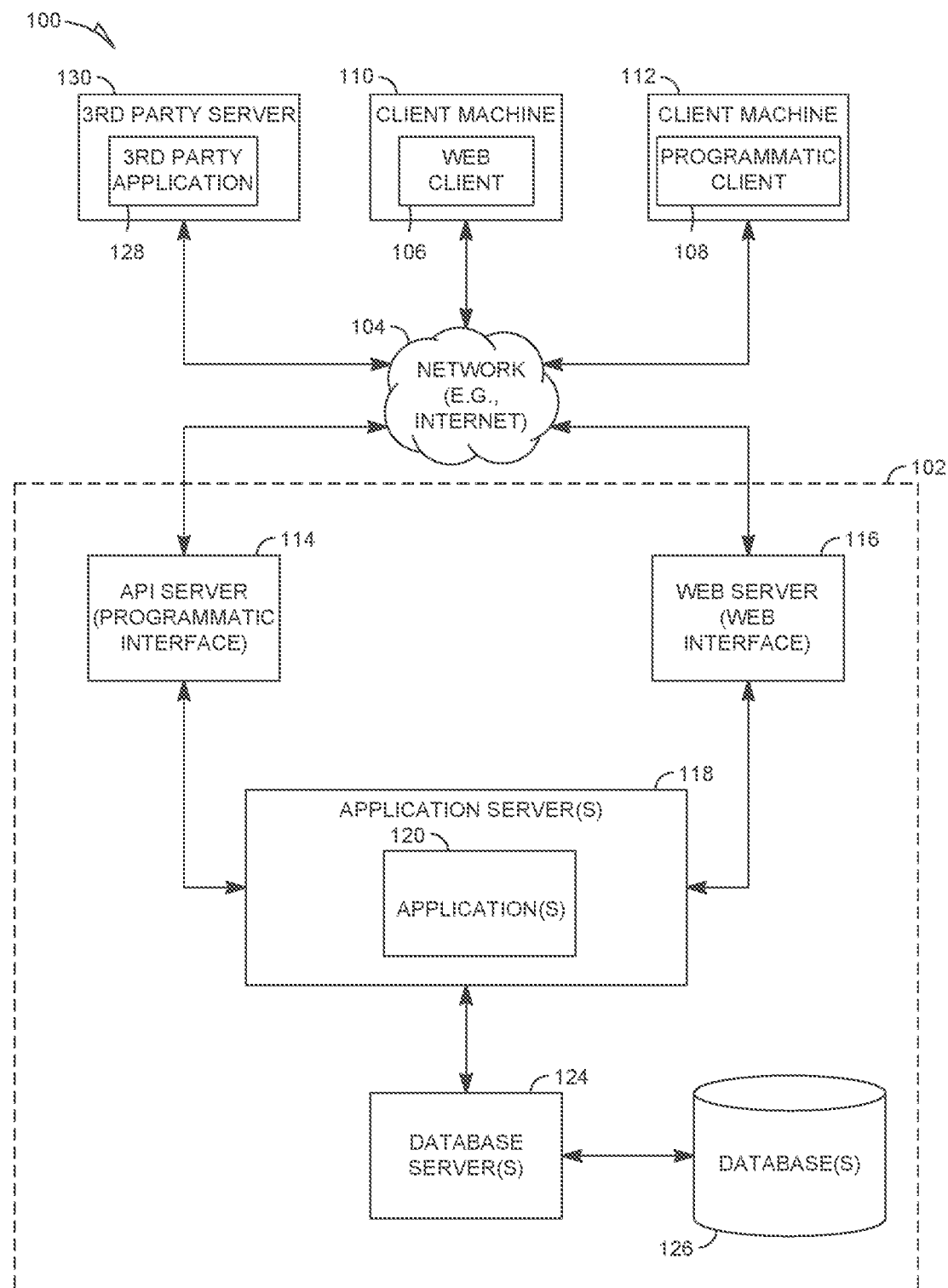
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application programming interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that art supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the client machines 110, 112 and the third-party server 130 may be a mobile device) to access and browse online content, such as any of the online content disclosed herein. A mobile server (e.g., the API server 114) may communicate with the mobile app and the application server(s) 118 in order to make the features of the present disclosure available on the mobile device.

Figure 2:
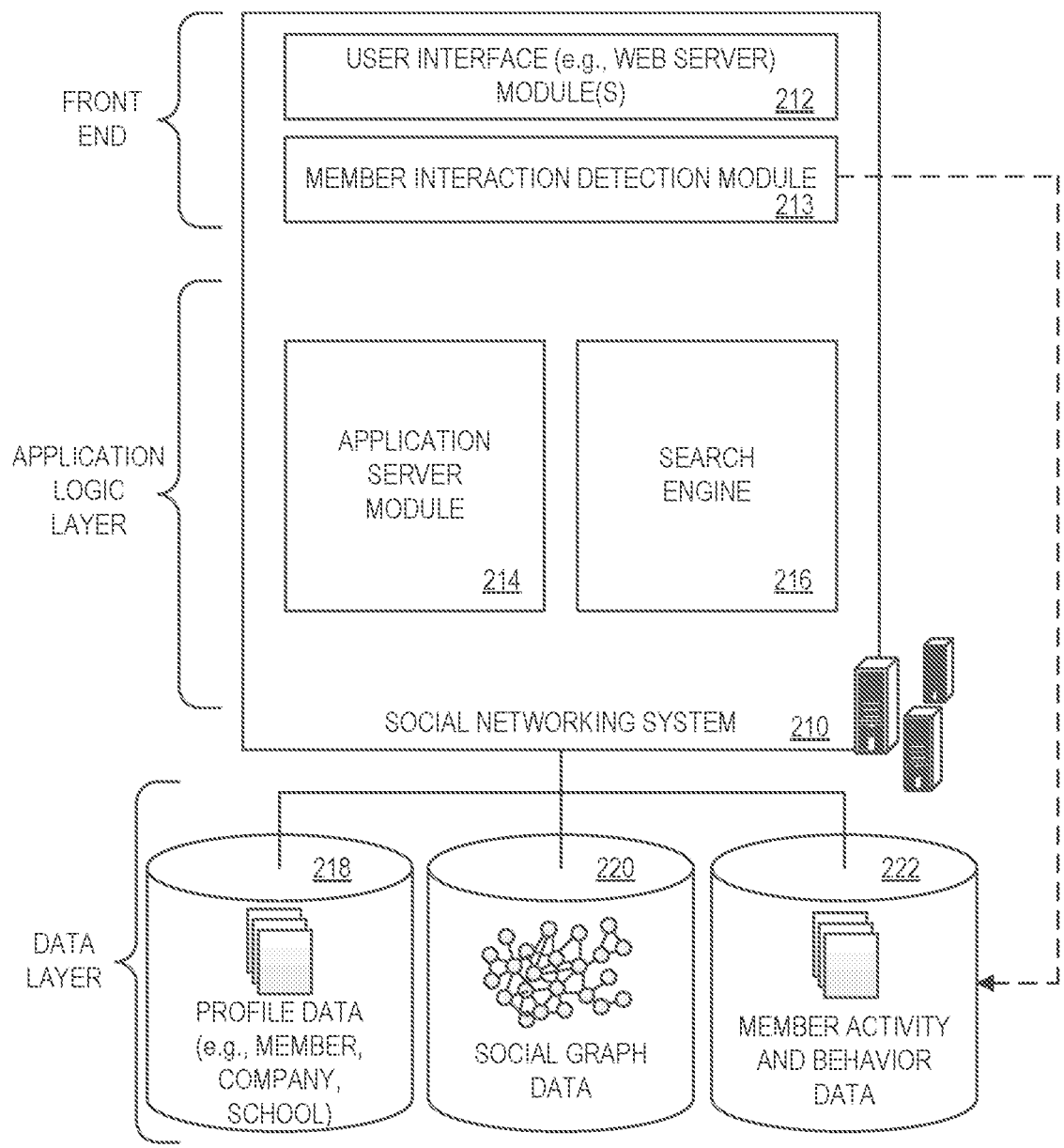
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases 126, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and; or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles that the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile. This importation of organization data and enrichment of the data will be described in more detail later in this document.

Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, "following" another member typically is a unilateral operation and, at least in some embodiments, does not require acknowledgement or approval by the member who is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking service system 210 provides an API module via which applications 120 and services can access various data and services provided or maintained by the social networking service. For example, using an API, an application 120 may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it ma also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222), as well as job postings. The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
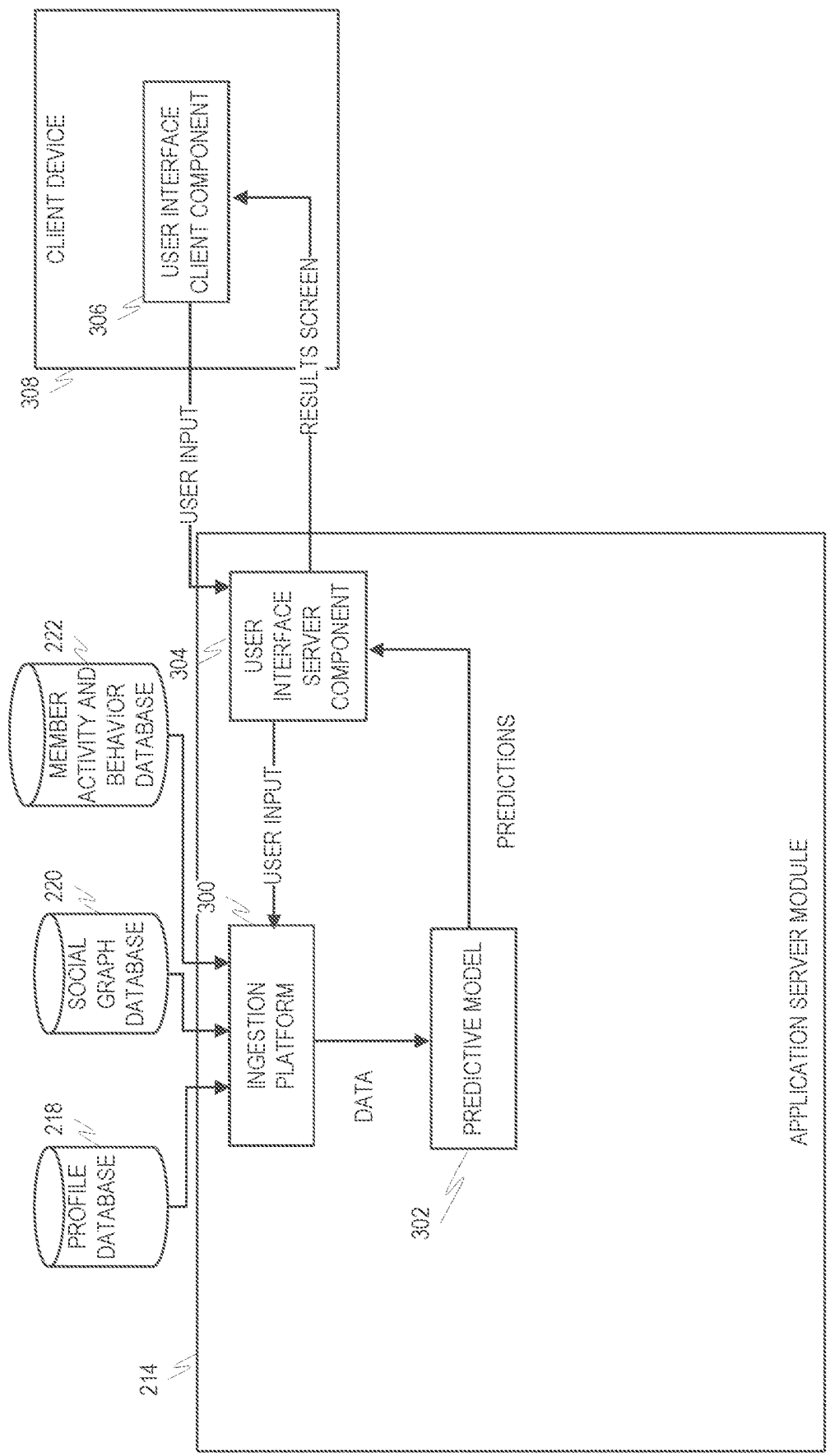
FIG. 3 is a block diagram illustrating the application server module of FIG. 2 in more detail.

FIG. 3 is a block diagram illustrating the application server module 214 of FIG. 2 in more detail. While in many embodiments, the application server module 214 will contain many subcomponents used to perform various different actions within the social networking system 210, in FIG. 3 only those components that are relevant to the present disclosure are depicted.

Here, an ingestion platform 300 obtains information from the profile database 218, the social graph database 220, and the member activity and behavior database 222 relevant to predictive model 302.

The ingestion platform 300 may then provide the relevant information from the profile database 218, the social graph database 220, and the member activity and behavior database 222 to the predictive model 302. In some example embodiments, this information is transmitted in the form of feature vendors. For example, each member profile may have its own feature vector formed of the information in the profile database 218, the social graph database 220, and the member activity and behavior database 222. In other example embodiments, the ingestion platform 300 sends raw information to the predictive model 302 and the predictive model 302 creates its own feature vectors from the raw information.

A user interface server component 304 communicates with a user interface client component 306 located on a client device 308 to run the predictive model 302 and return its results. For example, a user could instruct user interface client component 306 as to input, such as an identification of a product or service and a company to which the product or service could potentially be sold. This information could then be sent to the user interface server component 304, which can use this information to instruct the ingestion platform 300 to retrieve the appropriate information from the profile database 218, the social graph database 220, and the member activity and behavior database 222.

The results from the predictive model 302 could then be sent to the user interface server component 304 which, along with the user interface client component 306, could format the results for display to the user. Details about how these results could be displayed on the client device 308 via user interface client component 306 will be described in more detail below.

Figure 4:
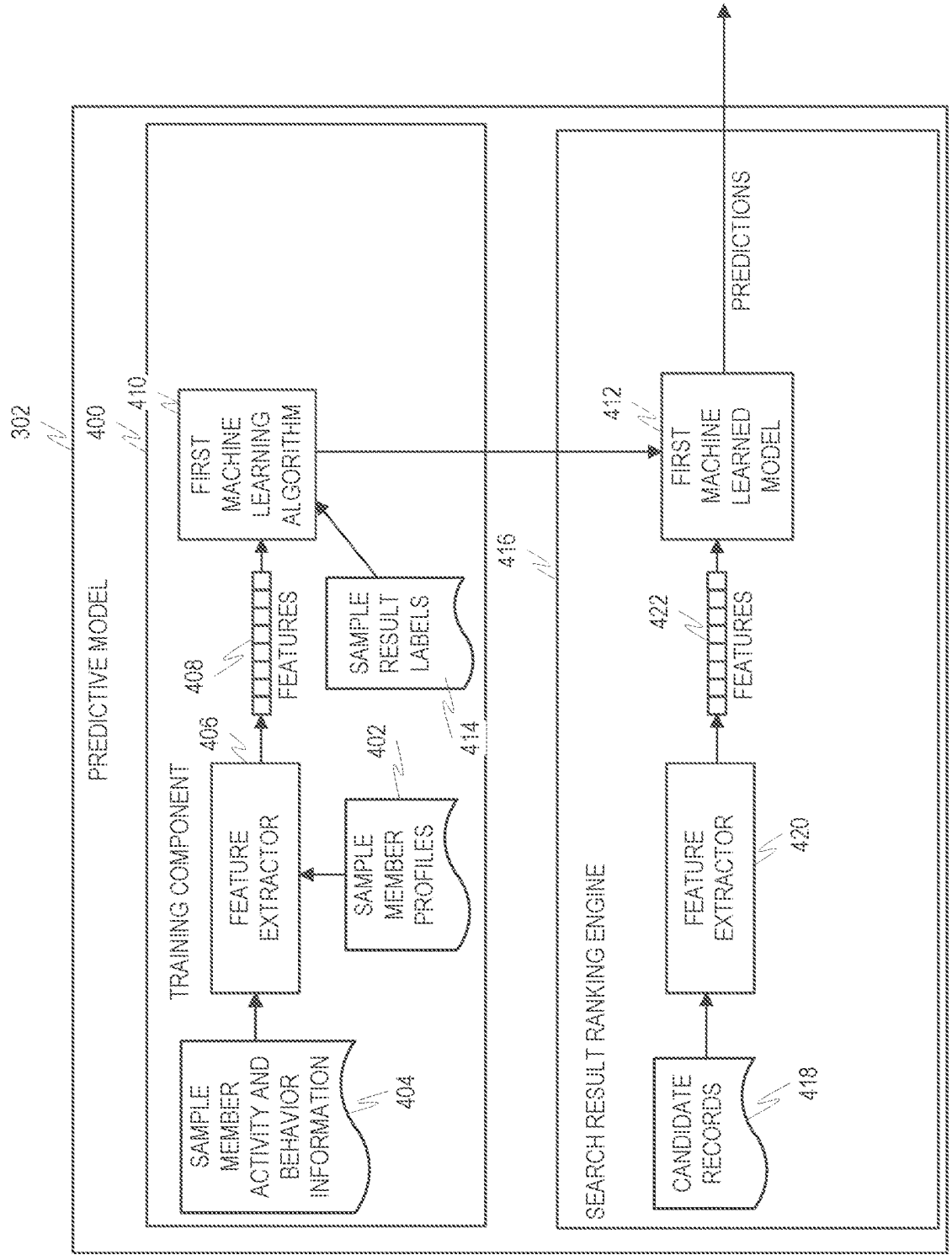
FIG. 4 is a block diagram illustrating the predictive model of FIG. 3 in more detail, in accordance with an example embodiment.

FIG. 4 is a block diagram illustrating the predictive model 302 of FIG. 3 in more detail, in accordance with an example embodiment. In a training component 400, sample member profiles 402 and sample member activity and behavior information 404 are fed to a feature extractor 406, which acts to extract curated features 408 from the sample member profiles 402 and sample member activity and behavior information 404. Different features may be extracted depending upon whether the member profile is assumed to be that of a prospective search result or that of a prospective searcher. A feature is a variable pertaining to an input piece of data. Since the input may, in some example embodiments, be data related to a member of a social networking service, such as a member profile, member usage and/or activity data, or social graph information, the feature may be, for example, a portion of the member profile, member usage and/or activity data, or social graph. The feature may also be a variable calculated from a portion of the data, such as an average, sum, difference, measurement, etc.

In an example embodiment, the curated features 408 are then used to as input to a first machine learning algorithm 410 to train a first machine learned model 412 to generate a probability that entities represented by the sample member profiles 402 will purchase a particular product or service. This training may include providing sample result labels 414 to the first machine learning algorithm 410. Each of these sample result labels 414 is a binary variable which indicates whether a corresponding entity purchased the particular product or service.

In a predictive engine 416, candidate records 418 are fed to a feature extractor 420, which acts to extract curated features 422 from the candidate records 418. In some example embodiments, the candidate records 418 include member profile information and member activity and behavior information 404 extracted by the ingestion platform 300, which can retrieve the appropriate information corresponding to potential search results from the profile database 218, the social graph database 220, and the member activity and behavior database 222. The curated features 422 are then used as input to the first machine learned model 412, which outputs a probability that the entity corresponding to the candidate records 418 will purchase the particular product or service.

In an example embodiment, the first machine learned model 412 includes an advanced model interpretation method based on local interpretable model-agnostic explanations (LIME). This advanced model interpretation method may be called xLIME, and includes localized stratified sampling and piecewise linear regression, both of which are missing in LIME.

The basic idea of LIME is that, given a target sample $x_k$, its prediction $\text{pre}(x_k)$ may be approximated by building a sample-specific linear model:

$$\text{pred}(X) \approx \beta_{k1}X_1 + \beta_{k2}X_2 + \ldots X \in \text{neighbor}(x_k)$$

where $X_j$ is the scaled feature j, and $\beta_{kj}$ is its corresponding coefficient. The reason we scale the feature values is to make their coefficients comparable.

From this linear model, the insights of a feature contributor and feature influencer can be directly obtained, where a feature contributor indicates a top driver feature for a certain company to have a high or low probability to upsell (or churn), and a feature influencer indicates a top driver feature that can be perturbed to increase/decrease probability for a certain company.

Feature contribution is determined by the product of coefficient $\beta_{kj}$ and the feature value $x_{kj}$. It describes the contribution of feature j to the final prediction.

Feature influence is determined by the coefficient $\beta_{kj}$. It describes how significantly the prediction will change if we perturb the value of feature j.

The $\beta$'s are learned through linear regression.

There are two major steps in LIME:
  Sampling: Perturb target sample at each feature level to generate pseudo-samples. Calculate the weights based on the Euclidean distance between the pseudo-samples and the target sample, and use the trained machine learned model to get the prediction value for each sample.
  Regression: Fit a (weighted) linear regression.

Figure 5:
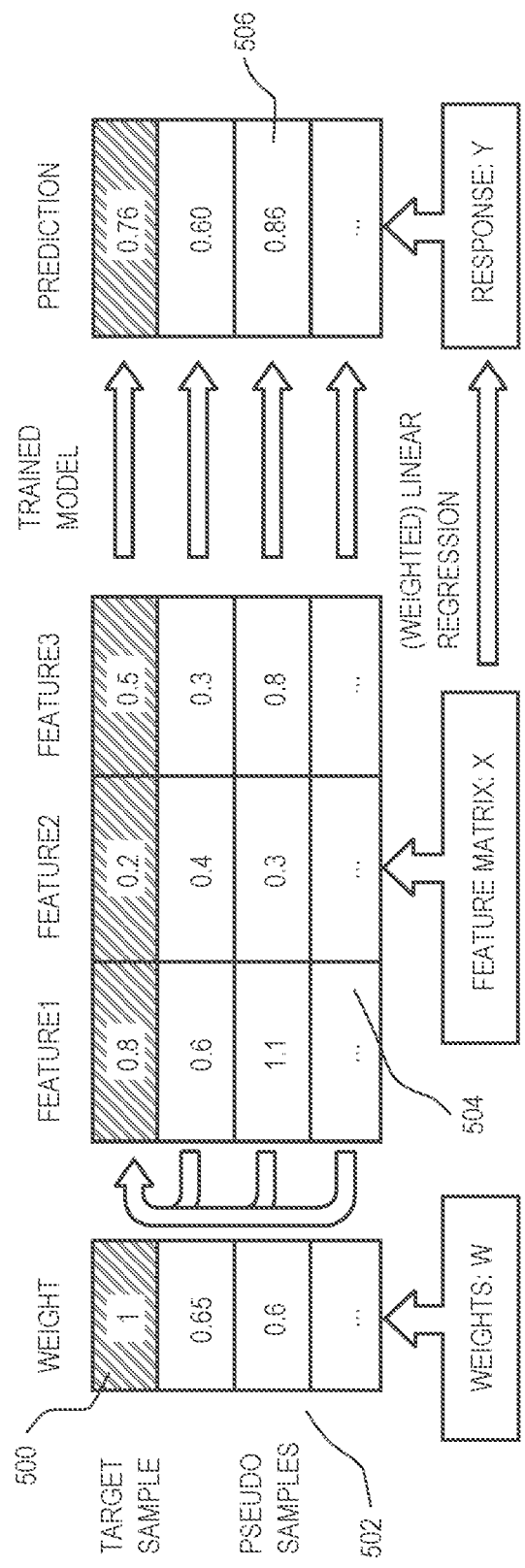
FIG. 5 is a diagram illustrating operations performed in local interpretable model-agnostic explanations (LIME) in accordance with an example embodiment.

FIG. 5 is a diagram illustrating operations performed in LIME in accordance with an example embodiment. A target sample 500 is used to generate pseudo-samples 502. Each feature of features 504 in pseudo samples 502 is generated from the target sample 500 according to a normal distribution centred at a sample mean with a sample standard deviation and these features 504 are passed through the trained machine learned model to produce predictions 506. LIME fits a weighted linear regression model and uses a single coefficient for each feature to describe the depiction change when the feature value is perturbed.

In an example embodiment, xLIME is built upon LIME. As in LIME, pseudo-samples are generated but localized stratified sampling is used, wherein feature values are generated in pseudo-samples according to feature empirical distribution and around the feature value in the target sample 500. This allows more local information to be contained in the pseudo-samples, around the target sample 500. The pseudo-samples are therefore more realistic than in LIME, for example nonnegative feature values are assigned to nonnegative features. xLIME can also better approximate the prediction of a target sample 500.

xLIME then fits a piecewise linear regression model with the changing point at the feature values of the target sample 500. Two coefficients are used for each feature, to describe the prediction change when the feature value is increased or decreased separately. Most feature 504s' impacts on prediction scores will vary based on whether the impact is positive or negative. xLIME is thus able to capture the differences, whereas LIME cannot. xLIME can therefore provide more accurate lists of top positive feature influences and top negative feature influencers, whereas LIME cannot distinguish between these two lists.

xLIME generates the values of feature j in pseudo-samples according to $$p_j(X_j) \cdot N(x_{kj}, (\alpha \cdot s_j)^2)$$

Here $p_j(X_j)$ is the empirical distribution, $x_{kj}$ is the feature value of target sample 500, $s_j$ is the feature standardized deviation, and $\alpha$ is the interpretable range.

Figure 6:
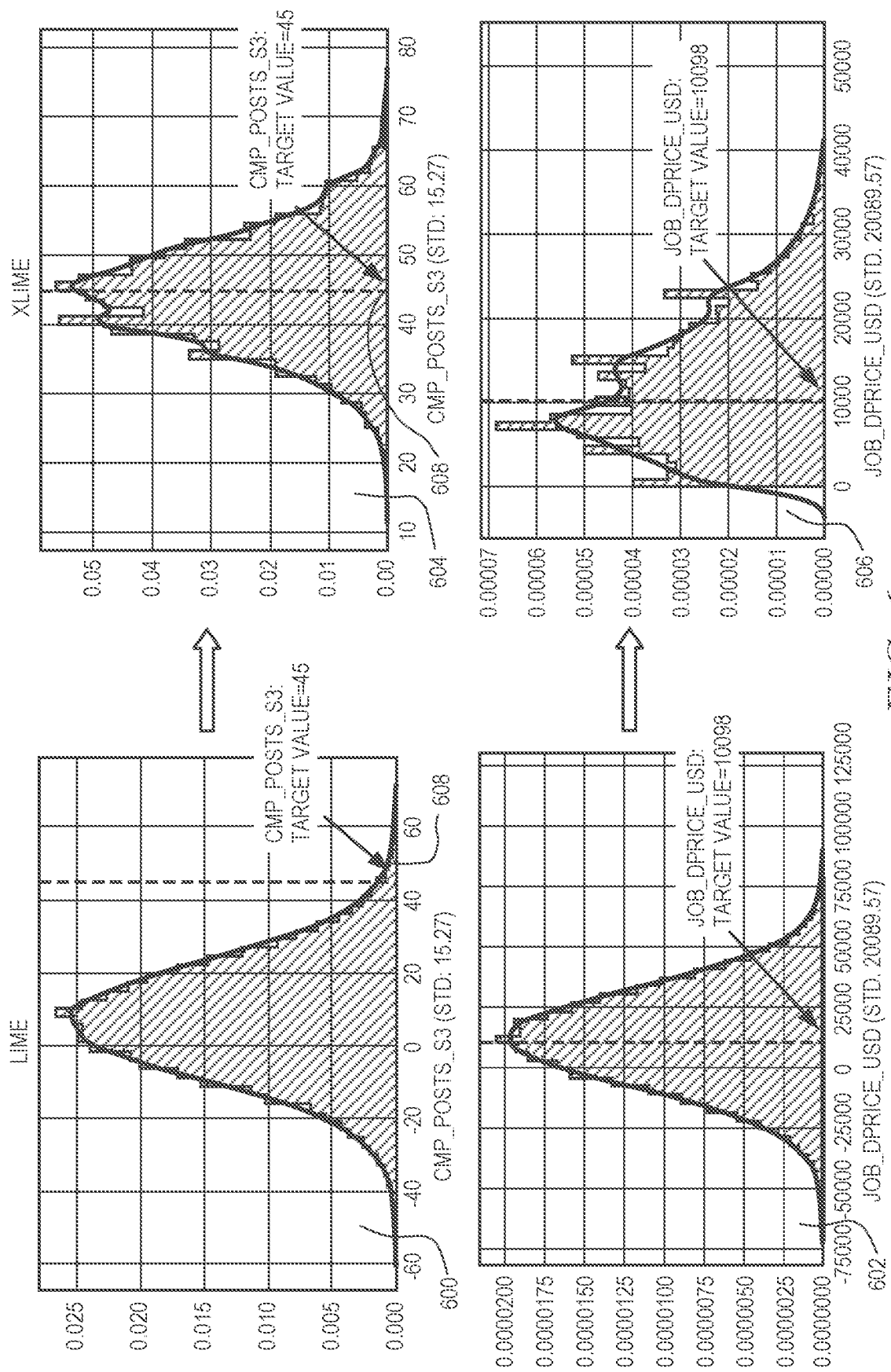
FIG. 6 is a diagram illustrating sampling based on empirical distribution around a target feature value at each feature level, in accordance with an example embodiment.

FIG. 6 is a diagram illustrating sampling based on empirical distribution around the feature value of target sample at each feature level, in accordance with an example embodiment. Specifically, two example distributions 600, 602 for the LIME method and two corresponding example distributions 604, 606 for the xLIME method are depicted, in order to compare and contrast. For distributions 600 and 604, assume the value of feature cmp_posts_s3 is used. The target feature value is 45. As can be seen in distribution 600, the LIME method generates the feature values according to the normal distribution centered at a sample mean with sample standard deviation. As such, a traditional "bell curve" is observed, where most of the generated values are far away from the target feature value 608. In the xLIME distribution 604, however, the generated values are centered around the target feature value 608.

In another example using job_dprice_usd as the feature and a target feature value of 10098, the LIME distribution 602 has a lot of generated values below zero, which is unrealistic, because LIME totally ignores the underlying empirical distribution of the feature. In the xLIME distribution 606, however, the feature empirical distribution is considered, so the generated values are all above zero.

xLIME has not only considered the underlying feature empirical distribution to make generated feature values reasonable, but also implemented sampling around the target feature value so that generated pseudo-samples will contain much more local information than LIME.

The interpretable range $\alpha$ determines how wide the range is to generate pseudo-samples around the target sample 500. It controls the tradeoff between interpretable coverage and local accuracy:

Large $\alpha$ makes xLIME interpretable to a wide range of feature perturbation. However, it makes the prediction estimation close to the target sample 500 less accurate.

Small $\alpha$ makes the prediction estimation close to the target sample 500 more trustworthy, but the range of feature perturbation narrows down.

In practice, $\alpha$ may be chosen according to the desired amount of perturbation of the feature values. If a perturbation of one half of standard deviation is desired, it can be set at $\alpha=0.5$. In fact, $\alpha$ should not be set too large since each feature perturbation has its ceiling.

Figure 7:
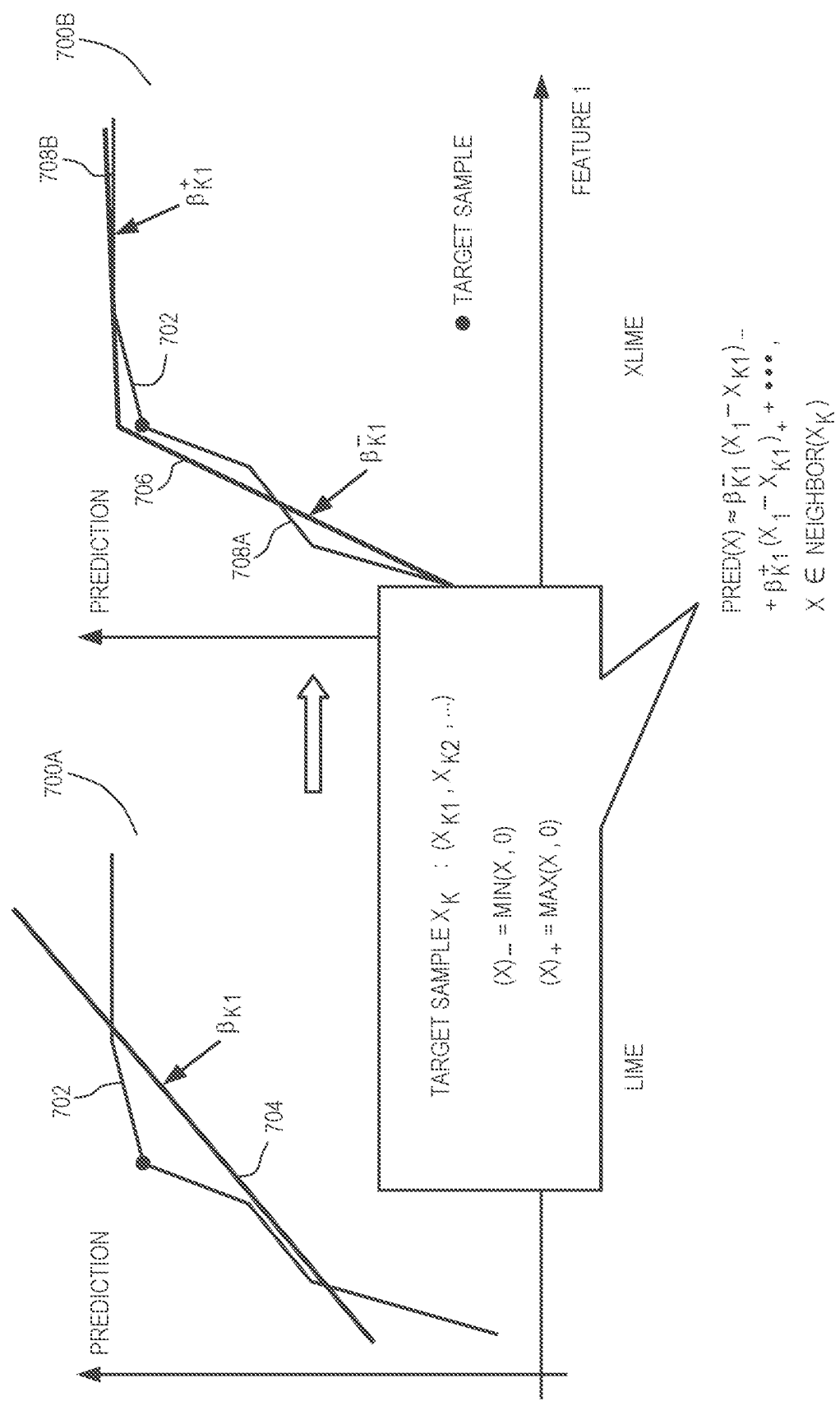
FIG. 7 is a diagram illustrating the difference in plots when LIME is used versus xLIME, in accordance with an example embodiment.

As described above, xLIME then fits a piecewise linear regression model with a changing point at the feature values of the target sample 500. FIG. 7 is a diagram illustrating the difference in plots 700A, 700B when LIME is used versus xLIME, in accordance with an example embodiment. Specifically, plot 700A contains a first line 702 indicating the underlying truth of how a change in values in feature 1 (on the x-axis) would change prediction values (the y-axis). This first 702 is the same in plot 700A and 700B. Second line 704 indicates the approximated prediction values from linear model. This is contrasted to third line 706 in plot 700B, which essentially creates two different slopes 708A, 708B, one for negative changes in the feature and one for positive. From the first line 702, it could be seen that when the feature value is decreased, the prediction drops a lot, but when the feature value is increased, the prediction only increases a little bit. Thus, feature 1 can be determined to be the top negative feature influencer, but not necessarily the top positive feature influencer.

Thus, in xLIME, two lines are fit to the plot, with a change point right at the target feature value. In this case, $\beta_1^-$ and $\beta_1^+$ will describe how prediction changes when we decrease or increase the feature value separately. Now there is a large magnitude of $\beta_1^-$ but small magnitude of $\beta_1^+$, thus, feature 1 will be correctly classified into the top negative feature influencer list rather than the top positive feature influencer list. This coincides with the underlying truth.

Once these two aspects of xLIME have been applied, the top feature contributor ma be determined by determining features 504 having a large magnitude of $\beta_{kj}^- \cdot x_{kj}$. The top positive feature influencer may be determined by determining features 504 having a large magnitude of negative $\beta_{kj}^-$ or positive $\beta_{kj}^+$. The top negative feature influencer may be determined by determining features 504 having a large magnitude of positive $\beta_{kj}^-$ or negative $\beta_{kj}^+$.

Figure 8:
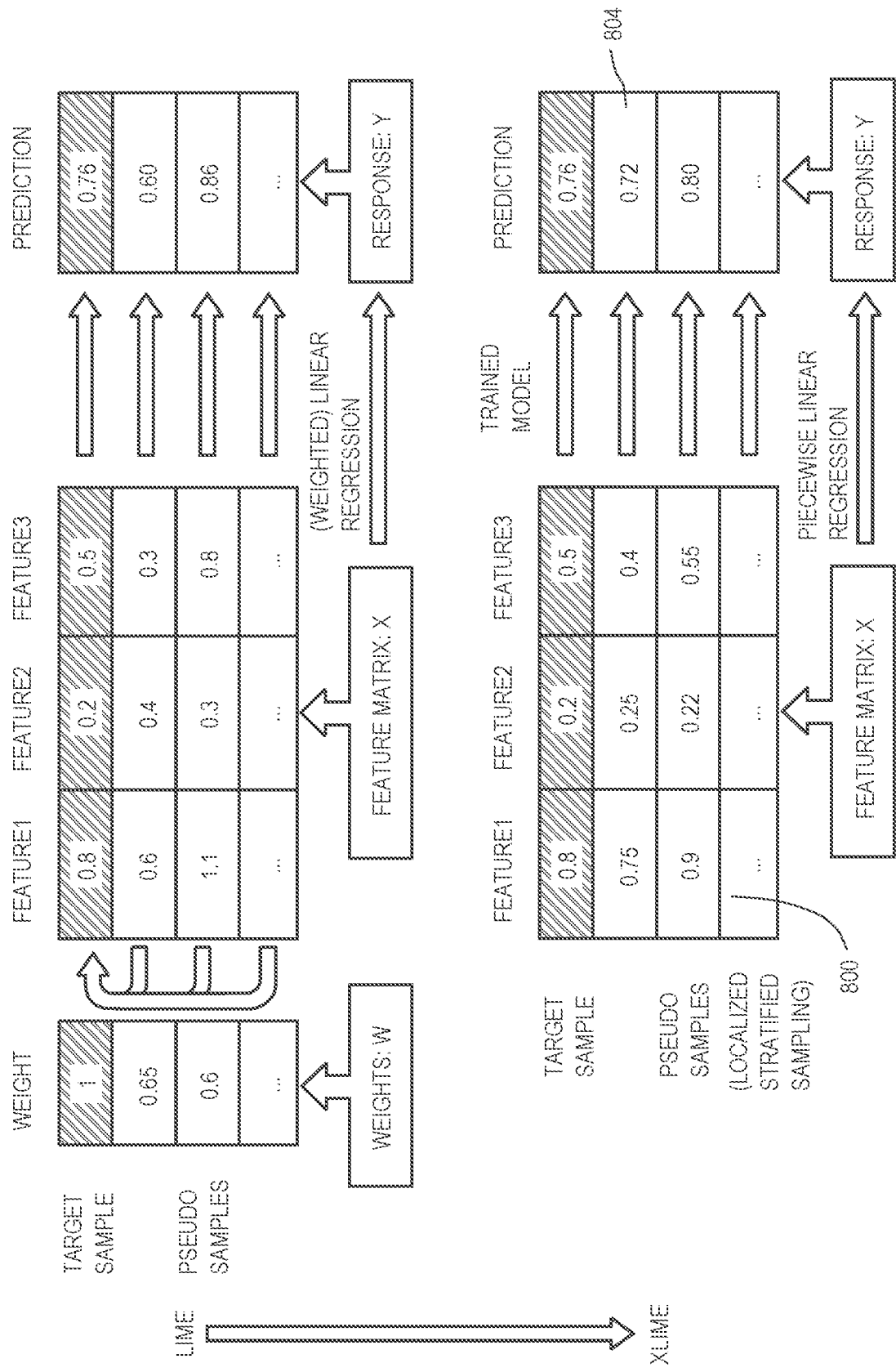
FIG. 8 is a diagram illustrating an example of the xLIME method, in accordance with an example embodiment.

FIG. 8 is a diagram illustrating an example of the xLIME method, in accordance with an example embodiment. As can be seen, features in pseudo samples 800 are generated via localized stratified sampling, while the piecewise linear regression is applied to pseudo samples 800 and their predictions 804 from the trained machine learned model.

Figure 9:
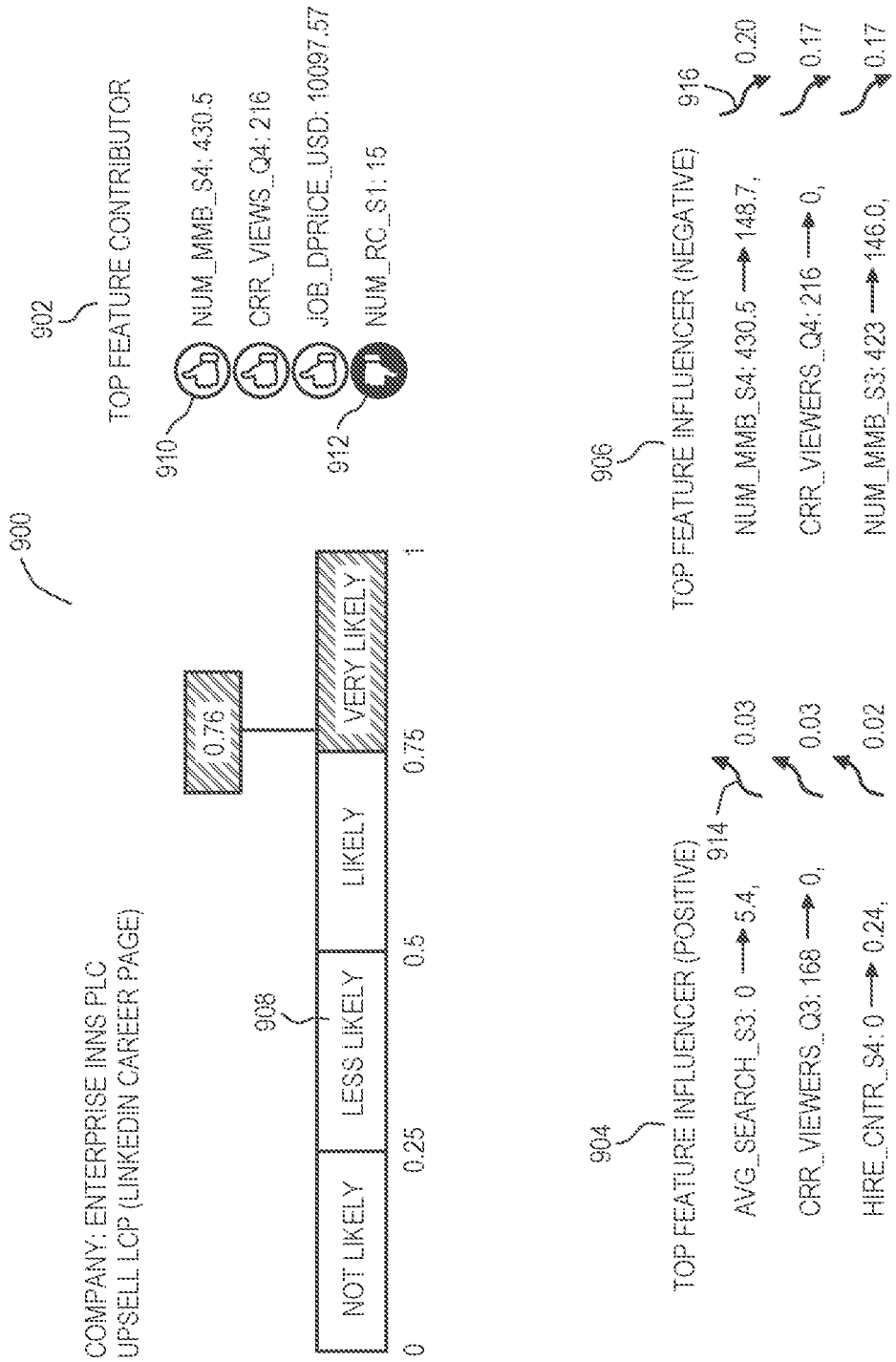
FIG. 9 is an example of a user interface for reporting top feature contributor, top positive feature influence, and top negative feature influencer, in accordance with an example embodiment.

FIG. 9 is an example of a user interface 900 for reporting top feature contributor 902, top positive feature influencer 904, and top negative feature influencer 906, in accordance with an example embodiment. Here, the company is named "Enterprise Inns plc" and the product/service being sold is the LinkedIN™ Career Page. A graph 908 may be used to indicate the overall likelihood that the company will purchase the product/service. As can be seen here, the overall likelihood is predicted by the predictive model 302 to be 76%.

The top feature contributor 902 area lists one or more of the top feature contributors 902. Additionally, a "thumbs-up" icon, such as icon 910, may be placed next to features 504 contributing the most to increase the likelihood while a "thumbs-down" icon, such as icon 912, may be placed next to features 504 contributing the most to decrease the likelihood.

The top positive feature influencer 904 area lists the top positive feature influencers and their corresponding influence scores. Additionally, an upwards arrow, such as arrow 914 may be shown next to the positive influencers.

The top negative feature influencer 906 area lists the top negative feature influencers and their corresponding influence scores. Additionally, a downwards arrow, such as arrow 916 may be shown next to the negative influencers.

Figure 10:
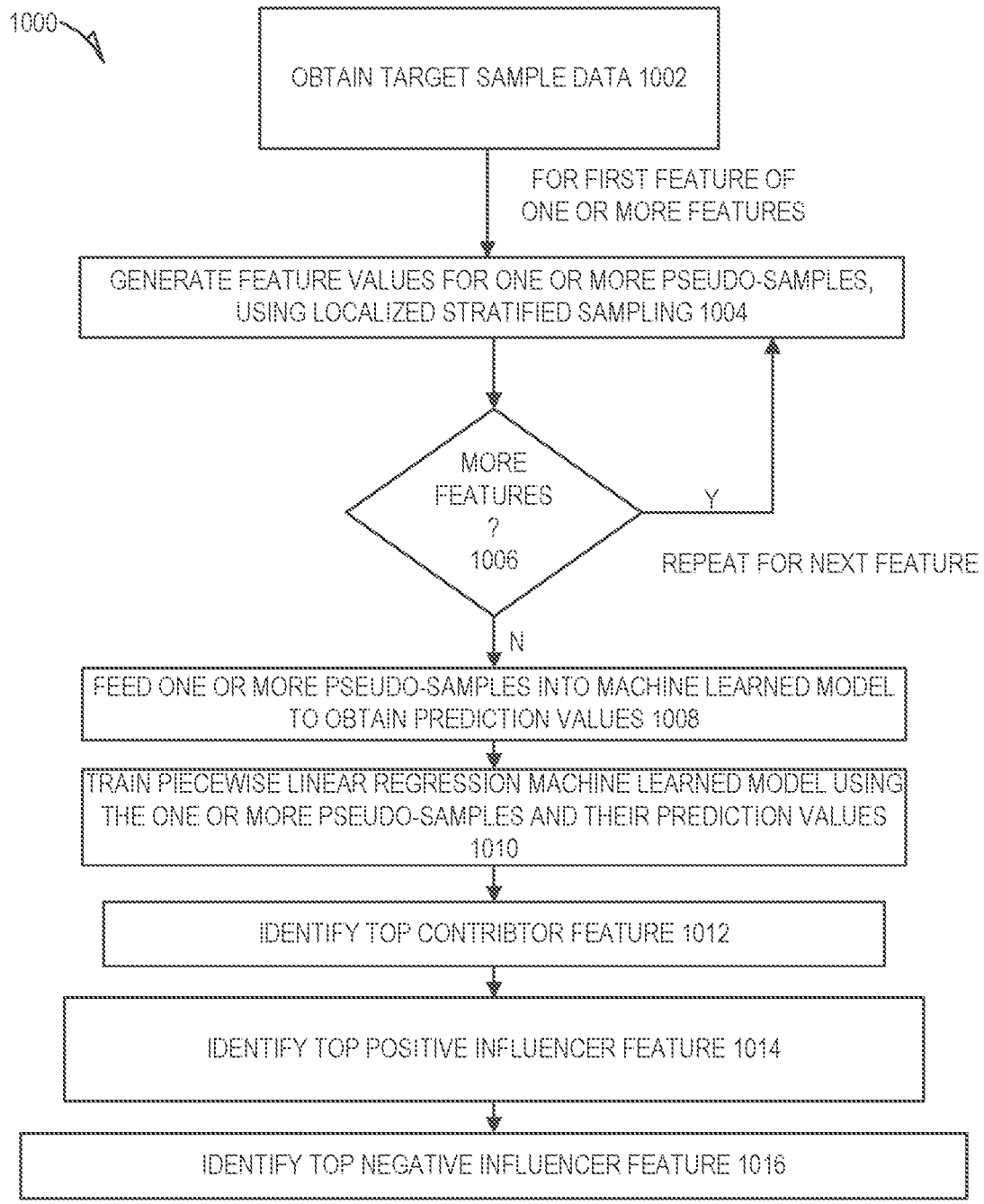
FIG. 10 is a flow diagram illustrating a method for identifying top feature contributors and top feature influencers for a target sample in a trained machine learned predictive model, in accordance with an example embodiment.

FIG. 10 is a flow diagram illustrating a method 1000 for identifying top feature contributors and top feature influencers for a target sample in a trained machine learned predictive model in accordance with an example embodiment. At operation 1002, target sample data is obtained. The target sample data has one or more features 504. A loop is then begun for each feature in the one or more features 504. At operation 1004, feature values for one or more pseudo-samples are generated. This generating may be based on localized stratified sampling, the localized stratified sampling based on an empirical distribution of feature value, feature value in the target sample data, a standard deviation, and an interpretable range. At operation 1006, it is determined if there are any more features 504 in the one or more features 504. If so, then the method 1000 loops back to operation 1004 for the next feature. If not, then at operation 1008, the one or more pseudo-samples are fed into the trained machine learned model to obtain their prediction values. At operation 1010, a piecewise linear regression model is trained using the one or more pseudo-samples and their prediction values, the piecewise linear regression model having two coefficients for each feature, a first coefficient describing prediction change when a corresponding feature value is increased and a second coefficient describing prediction change when a corresponding feature value is decreased. At operation 1012, a top feature contributor is identified based on a feature of the one or more features 504 of the target sample 500 having a greatest magnitude of a combination of second coefficient and feature value in the target sample data. At operation 1014, a top positive feature influencer is identified based on a feature of the one or more features 504 of the target sample 500 having a greatest magnitude of positive first coefficient or greatest magnitude of negative second coefficient. At operation 1016, a top negative feature influencer is identified based on a feature of the one or more features 504 of the target sample 500 having a greatest magnitude of negative first coefficient or greatest magnitude of positive second coefficient.

Figure 11:
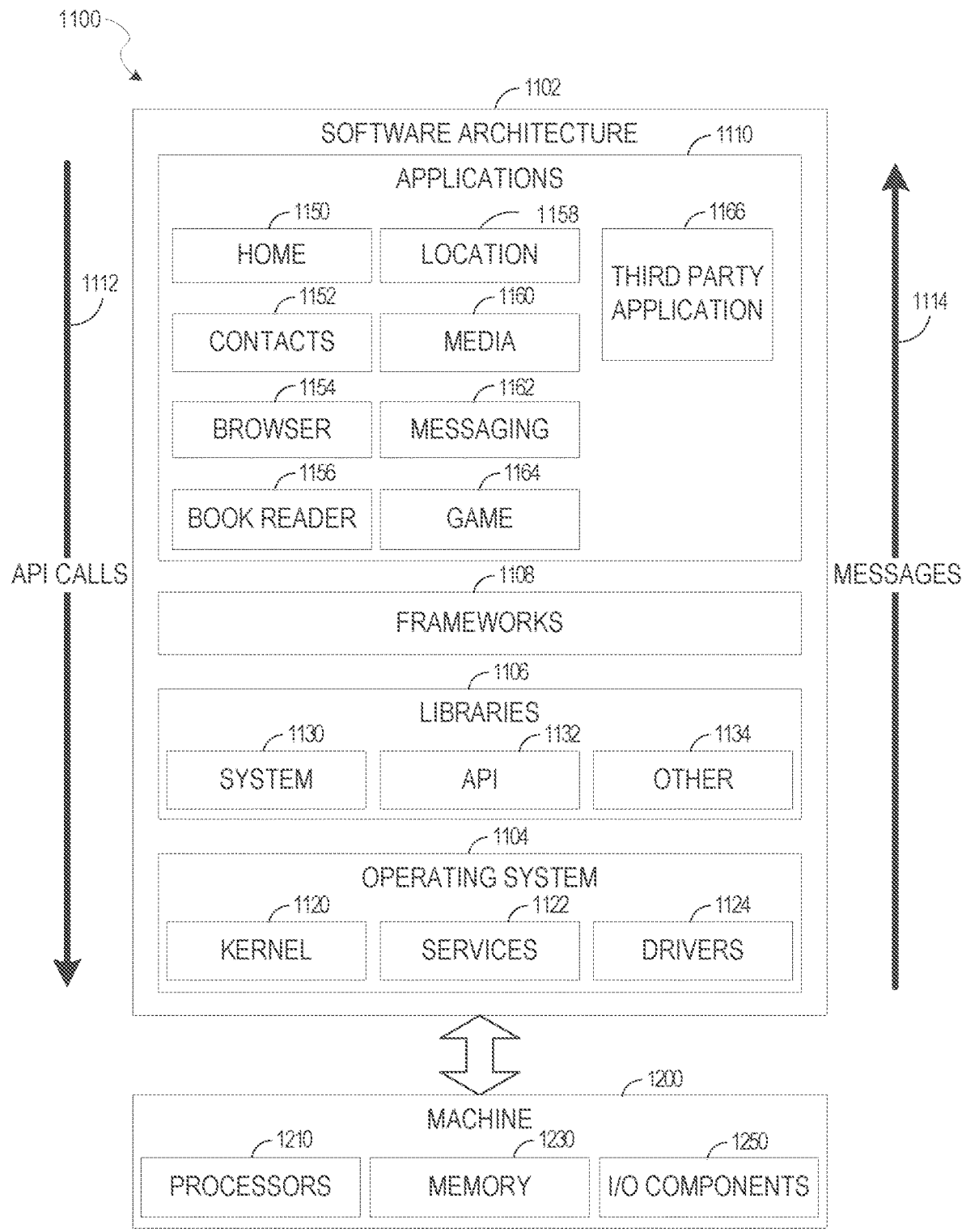
FIG. 11 is a block diagram illustrating an architecture of software, which can be installed on any one or more of the devices described above.

FIG. 11 is a block diagram 1100 illustrating an architecture of software 1102, which can be installed on any one or more of the devices described above. FIG. 11 is merely a non-limiting example of a software architecture, and it will be appreciated that many other architectures can be implemented to facilitate the functionality described herein. In various embodiments, the software 1102 is implemented by hardware such as a machine 1200 of FIG. 12 that includes processors 1210, memory 1230, and input/output (I/O) components 1250. In this example architecture, the software architecture 1102 can be conceptualized as a stack of layers where each layer may provide a particular functionality. For example, the software architecture 1102 includes layers such as an operating system 1104, libraries 1106, frameworks 1108, and applications 1110. Operationally, the applications 1110 invoke API calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphic user interface (GUI) functions, high-level resource management, high-level location services, and so forth. The frameworks 1108 can provide a broad spectrum of other APIs that can be utilized by the applications 1110, some of which may be specific to a particular operating system 1104 or platform.

In an example embodiments, the applications 1110 include a home application 1150, a contacts application 1152, a browser application 1154, a book reader application 1155, a location application 1158, a media application 1150, a messaging application 1162, a game application 1164, and a broad assortment of other applications such as a third-party application 1166. According to some embodiments, the applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third-party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1166 can invoke the API calls 1112 provided by the operating system 1104 to facilitate functionality described herein.

Figure 12:
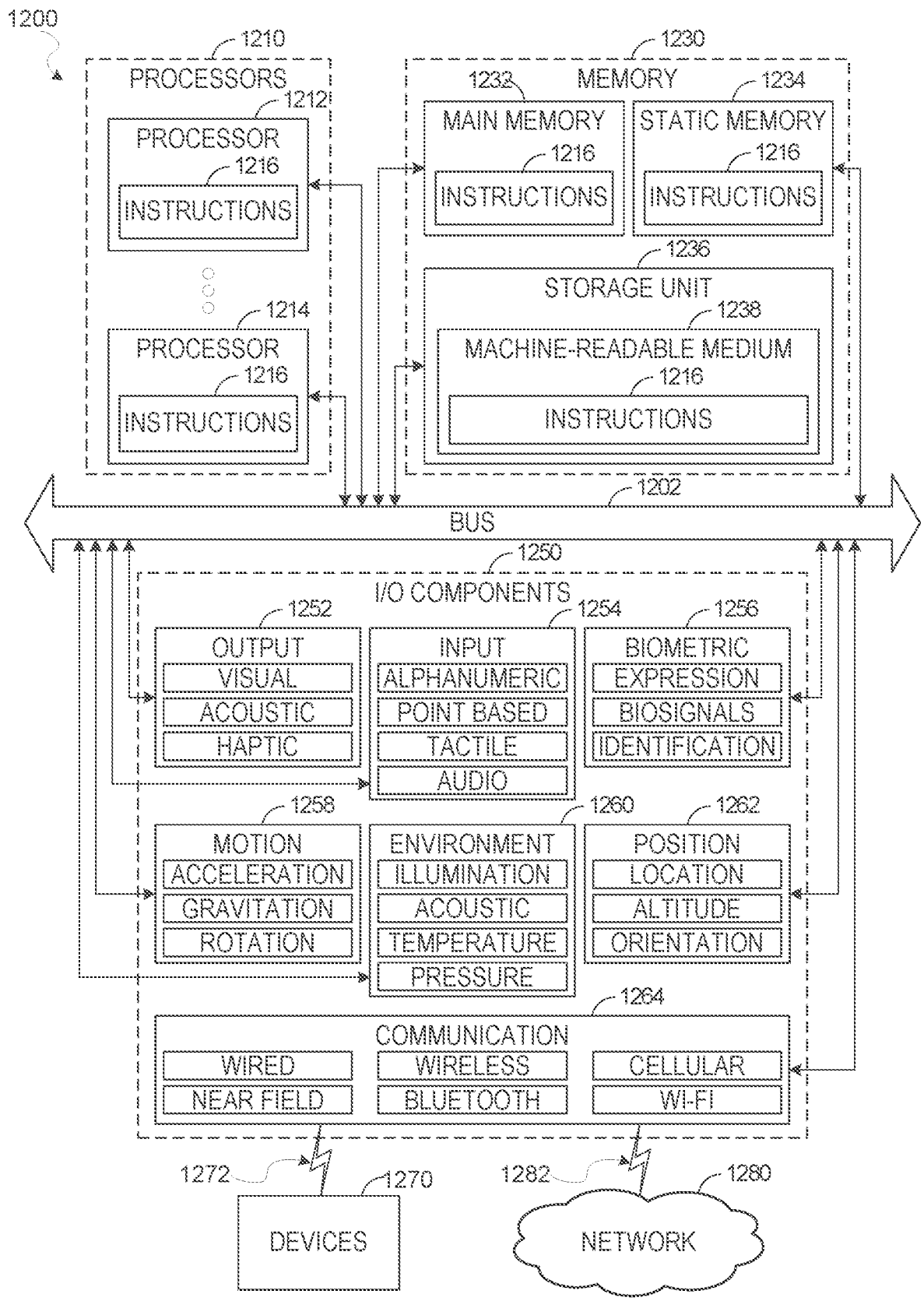
FIG. 12 illustrates a diagrammatic representation of a machine in the form of a computer system within which a set of instructions may be executed for causing the machine to perform any one or more of the methodologies discussed herein, according to an example embodiment.

FIG. 12 illustrates a diagrammatic representation of a machine 1200 in the form of a computer system within which a set of instructions may be executed for causing the machine to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application 1110, an applet, an app, or other executable code) for causing the machine 1200 to perform any one or more of the methodologies discussed herein may be executed. For example, the instructions 1216 may cause the machine 1200 to execute the method 1000 of FIG. 10.

Additionally, or alternatively, the instructions 1216 may implement FIGS. 1-10, and so forth. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), ASIC, a radio-frequency integrated circuit (RFIC), another processor, or any suitable combination thereof) may include, for example, a processor 1212 and a processor 1214 that may execute the instructions 1216. The term "processor" is intended to include multi-core processors that may comprise two or more independent processors (sometimes referred to as "cores") that may execute instructions 1612 contemporaneously. Although FIG. 12 shows multiple processors 1210, the machine 1200 may include a single processor with a single core, a single processor with multiple cores (e.g., a multi-core processor), multiple processors with a single core, multiple processors with multiples cores, or any combination thereof.

The memory 1230 may include a main memory 1232, a static memory 1234, and a storage unit 1236, all accessible to the processors 1210 such as via the bus 1202. The main memory 1230, the static memory 1234, and storage unit 1236 store the instructions 1215 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 may include a wide variety of components to receive input, provide output, produce output, transmit information, exchange information, capture measurements, and so on. The specific I/O components 1250 that are included in a particular machine 1200 will depend on the type of machine 1200. For example, portable machines such as mobile phones will likely include a touch input device or other such input mechanisms, while a headless server machine will likely not include such a touch input device. It will be appreciated that the I/O components 1250 may include man other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1262 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1270 may be another machine or an of a wide variety of peripheral devices (e.g., a peripheral device coupled via a USB).

Moreover, the communication components 1264 may detect identifiers or include components operable to detect identifiers. For example, the communication components 1264 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

Executable Instructions And Machine Storage Medium

The various memories (i.e., 1230, 1232, 1234, and/or memory of the processor(s) 1210) and/or storage unit 1236 may store one or more sets of instructions 1216 and data structures (e.g., software) embodying or utilized by any one or more of the methodologies or functions described herein. These instructions (e.g., the instructions 1216), when executed by processor(s) 1210, cause various operations to implement the disclosed embodiments. As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions 1216 and/or data. The terms shall accordingly be taken to include, but not be limited to, solid-state memories, and optical and magnetic media, including memory internal or external to processors 1210. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1280 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., HTTP). Similarly, the instructions 1216 may be transmitted or received using a transmission medium via the coupling 1272 (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and includes digital or analog communications signals or other intangible media to facilitate communication of such software. Hence, the terms "transmission medium" and "signal medium" shall be taken to include any form of modulated data signal, carder wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
a memory; and
a computer-readable medium having instructions stored thereon, which, when executed by a processor, cause the system to:
obtain target sample data, the target sample data having one or more features;
for each feature of the one or more features of the target sample data, generate feature values for one or more pseudo-samples;
feed the one or more pseudo-samples into a trained machine learned model to obtain their prediction values;
train a piecewise linear regression model using the one or more pseudo-samples and their prediction values, the piecewise linear regression model having two coefficients for each feature, a first coefficient describing prediction change when a corresponding feature value is increased and a second coefficient describing prediction change when a corresponding feature value is decreased;
identify a top positive feature influencer based on a feature of the one or more features of the target sample data having a greatest magnitude of a positive first coefficient or a greatest magnitude of a negative second coefficient; and
identify a top negative feature influencer based on a feature of the one or more features of the target sample data having a greatest magnitude of a negative first coefficient or a greatest magnitude of a positive second coefficient.

2. The system of claim 1, wherein the generating of feature values for the one or more pseudo-samples is based on localized stratified sampling, the localized stratified sampling based on an empirical distribution of feature value and feature value in the target sample data.

3. The system of claim 2, wherein the instructions further cause the system to identify a top feature contributor based on a feature of the one or more features of the target sample data having a greatest magnitude of a combination of second coefficient and feature value in the target sample data.

4. The system of claim 2, wherein the generating is further based on a standard deviation.

5. The system of claim 4, wherein the generating is further based on an interpretable range.

6. The system of claim 5, wherein the interpretable range is set to 0.5 to cause perturbation to be one half of the standard deviation.

7. The system of claim 1, wherein the trained machine learned model is to predict likelihood that a member of a social networking service will purchase a particular good or service.

8. A method comprising:
obtaining target sample data, the target sample data having one or more features;
for each feature of the one or more features of the target sample data, generating feature values for one or more pseudo-samples,
feeding the one or more pseudo-samples into a trained machine learned model to obtain their prediction values;
training a piecewise linear regression model using the one or more pseudo-samples and their prediction values, the piecewise linear regression model having two coefficients for each feature, a first coefficient describing prediction change when a corresponding feature value is increased and a second coefficient describing prediction change when a corresponding feature value is decreased;
identifying a top positive feature influencer based on a feature of the one or more features of the target sample data having a greatest magnitude of a positive first coefficient or a greatest magnitude of a negative second coefficient; and
identifying a top negative feature influencer based on a feature of the one or more features of the target sample data having a greatest magnitude of a negative first coefficient or a greatest magnitude of positive second coefficient.

9. The method of claim 8, wherein the generating of feature values of the one or more pseudo-samples is based on localized stratified sampling, the localized stratified sampling based on an empirical distribution of feature value and feature value in the target sample data.

10. The method of claim 9, further comprising identifying a top feature contributor based on a feature of the one or more features of the target sample data having a greatest magnitude of a combination of second coefficient and feature value in the target sample data.

11. The method of claim 9, wherein the generating is further based on a standard deviation.

12. The method of claim 11, wherein the generating is further based on an interpretable range.

13. The method of claim 12, wherein the interpretable range is set to 0.5 to cause perturbation to be one half of the standard deviation.

14. The method of claim 8, wherein the trained machine learned model is to predict likelihood that a member of a social networking service will purchase a particular good or service.

15. A non-transitory machine-readable storage medium comprising instructions which, when implemented by one or more machines, cause the one or more machines to perform operations comprising:
    obtaining target sample data, the target sample data having one or more features;
    for each feature of the one or more features of the target sample data, generating feature values for one or more pseudo-samples;
    feeding the one or more pseudo-samples into a trained machine learned model to obtain their prediction values;
    training a piecewise linear regression model using the one or more pseudo-samples and their prediction values, the piecewise linear regression model having two coefficients for each feature, a first coefficient describing prediction change when a corresponding feature value is increased and a second coefficient describing prediction change when a corresponding feature value is decreased;
    identifying a top positive feature influencer based on a feature of the one or more features of the target sample data having a greatest magnitude of a positive first coefficient or a greatest magnitude of a negative second coefficient; and
    identifying a top negative feature influencer based on a feature of the one or more features of the target sample data having a greatest magnitude of a negative first coefficient or a greatest magnitude of a positive second coefficient.

16. The non-transitory machine-readable storage medium of claim 15, wherein the generating of feature values for the one or more pseudo-samples is based on localized stratified sampling, the localized stratified sampling based on an empirical distribution of feature value and feature value in the target sample data.

17. The non-transitory machine-readable storage medium of claim 16, wherein the operations further comprise identifying a top feature contributor based on a feature of the one or more features of the target sample data having a greatest magnitude of a combination of second coefficient and feature value in the target sample data.

18. The non-transitory machine-readable storage medium of claim 16, wherein the generating is further based on a standard deviation.

19. The non-transitory machine-readable storage medium of claim 18, wherein the generating is further based on an interpretable range.

20. The non-transitory machine-readable storage medium of claim 19, wherein the interpretable range is set to 0.5 to cause perturbation to be one half of the standard deviation.

* * * * *